(12) United States Patent
Tang et al.

(10) Patent No.: US 11,082,960 B2
(45) Date of Patent: Aug. 3, 2021

(54) METHOD AND DEVICE FOR TRANSMITTING OR RECEIVING CHANNEL STATE INFORMATION

(71) Applicant: GUANGDONG OPPO MOBILE TELECOMMUNICATIONS CORP., LTD., Guangdong (CN)

(72) Inventors: Hai Tang, Guangdong (CN); Ya'nan Lin, Guangdong (CN); Hua Xu, Ottawa (CA)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/235,042

(22) Filed: Dec. 28, 2018

(65) Prior Publication Data

US 2019/0150138 A1    May 16, 2019

Related U.S. Application Data

(63) Continuation of application No. PCT/CN2016/101219, filed on Sep. 30, 2016.

(51) Int. Cl.
*H04W 72/04* (2009.01)
*H04L 5/00* (2006.01)
(Continued)

(52) U.S. Cl.
CPC ....... *H04W 72/0413* (2013.01); *H04J 11/005* (2013.01); *H04L 1/0026* (2013.01);
(Continued)

(58) Field of Classification Search
CPC ............... H04W 72/042; H04W 72/04; H04W 72/0413; H04L 5/0057; H04L 1/0026; H04J 11/005
See application file for complete search history.

(56) References Cited

U.S. PATENT DOCUMENTS

2010/0296472 A1    11/2010  Lee
2013/0084910 A1*    4/2013  Suzuki ................. H04W 24/02
                                                    455/515
(Continued)

FOREIGN PATENT DOCUMENTS

CN    101911805 A    12/2010
CN    102215591 A    10/2011
(Continued)

OTHER PUBLICATIONS

Corresponding extended European search report dated Aug. 2, 2019 Appln. No. 16917334.1.
(Continued)

*Primary Examiner* — Omer S Mian

(57) ABSTRACT

Provided are a method and a device for transmitting or receiving channel state information (CSI), where the method for transmitting CSI includes: transmitting, by a terminal device, a resource request message to a network device according to the CSI meeting a CSI trigger condition; receiving, by the terminal device, a resource configuration message from the network device; transmitting, by the terminal device, the CSI to the network device according to the transmission resource. In the method for transmitting CSI according to the embodiments of the present disclosure, the terminal device determines whether to transmit the CSI according to whether the CSI meets the trigger condition for CSI transmission, and requests the transmission resource for transmitting the CSI from the network device, thereby reducing the transmission resource occupied by the CSI transmission and increasing the flexibility in transmitting the CSI.

9 Claims, 4 Drawing Sheets

(51) Int. Cl.
  *H04L 1/00*    (2006.01)
  *H04J 11/00*    (2006.01)
(52) U.S. Cl.
  CPC .......... *H04L 5/0057* (2013.01); *H04W 72/04* (2013.01); *H04W 72/042* (2013.01)

(56) References Cited

U.S. PATENT DOCUMENTS

| | | | |
|---|---|---|---|
| 2013/0148611 A1 | 6/2013 | Moulsley et al. | |
| 2013/0337863 A1 | 12/2013 | Lee | |
| 2015/0271728 A1* | 9/2015 | Tie | H04W 24/10 370/236 |
| 2019/0159186 A1* | 5/2019 | Guan | H04L 1/0026 |

FOREIGN PATENT DOCUMENTS

| | | |
|---|---|---|
| CN | 103081374 A | 5/2013 |
| CN | 103493401 A | 1/2014 |
| CN | 104079386 A | 10/2014 |
| JP | 2013541263 A | 11/2013 |
| WO | 2009096698 A2 | 8/2009 |
| WO | WO-2009096698 A2 * | 8/2009 .......... H04L 1/0026 |
| WO | 2012028204 A1 | 3/2012 |
| WO | 2012/115364 A2 | 8/2012 |
| WO | 2013021531 A1 | 2/2013 |
| WO | 2015139644 A2 | 9/2015 |

OTHER PUBLICATIONS

The International Search Report dated Jun. 5, 2017; PCT/CN2016/101219.
The First Office Action of corresponding Chinese application No. 201680086687.2, dated Jun. 10, 2020.
The Second Office Action of corresponding Chinese application No. 201680086687.2, dated Aug. 28, 2020.
The First Office Action of corresponding Indian application No. 201917000312, dated Jul. 26, 2020.
The First Office Action of corresponding Japanese application No. 2019-516245, dated Oct. 13, 2020.
The first Office Action of corresponding Taiwan application No. 106129441, dated Jan. 29, 2021.
The first Office Action of corresponding European application No. 16917334.1, dated May 6, 2021.

* cited by examiner

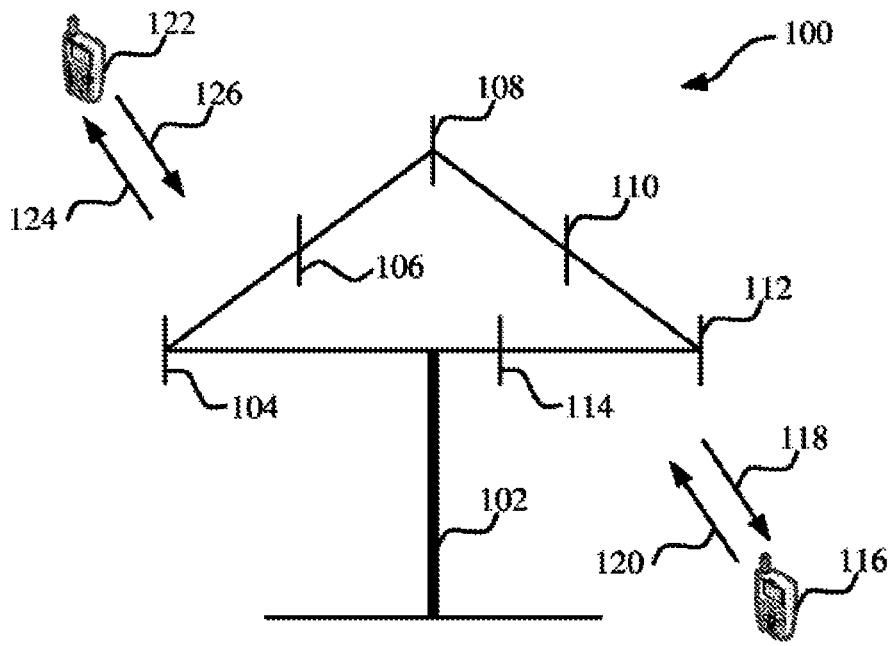

| A terminal device transmits a resource request message to a network device according to the channel state information (CSI) meeting a CSI trigger condition, where the resource request message is used to request the network device to assign a transmission resource for transmitting the CSI | S210 |

| The terminal device receives a resource configuration message from the network device, where the resource configuration message is used to configure the transmission resource | S220 |

| The terminal device transmits the CSI to the network device according to the transmission resource | S230 |

A network device receives a resource request message from a terminal device, where the resource request message is used to request the network device to assign a transmission resource for transmitting the channel state information (CSI) ⎯ S310

The network device transmits a resource configuration message to the terminal device, where the resource configuration message is used to configure the transmission resource ⎯ S320

The network device receives the CSI which is transmitted by the terminal device according to the transmission resourc ⎯ S330

FIG. 3

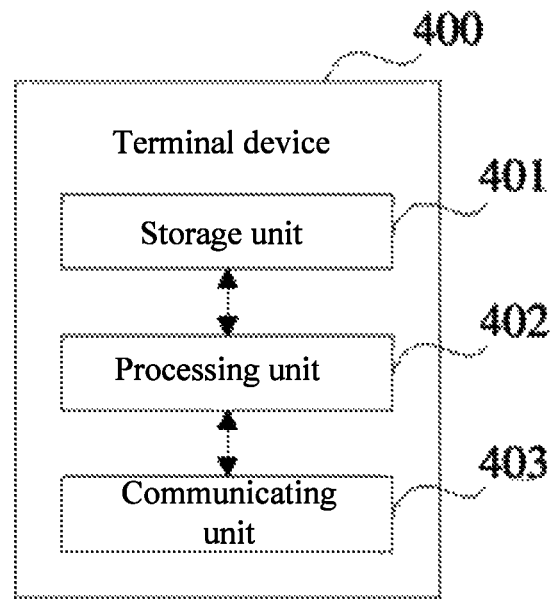

FIG. 4A

METHOD AND DEVICE FOR TRANSMITTING OR RECEIVING CHANNEL STATE INFORMATION

CROSS-REFERENCE TO RELATED APPLICATIONS

This application is a continuation application of the International application PCT/CN2016/101219, filed on Sep. 30, 2016, entitled "METHOD AND DEVICE FOR TRANSMITTING OR RECEIVING CHANNEL STATE INFORMATION", the content of which is hereby incorporated by reference in its entirety.

TECHNICAL FIELD

The present disclosure relates to the field of communication, and more particularly, to a method and a device for transmitting or receiving channel state information (CSI).

BACKGROUND

In a wireless communication network, a user equipment (UE) needs to perform channel estimation when demodulating data, in order to eliminate influence factors such as channel transmission characteristics. For example, in a Long Term Evolution (LTE) system, a UE may utilize a channel-state information reference signal (CSI-RS) informed by a base station (BS) to perform channel estimation, and transmit a result of the channel estimation (for example, CSI) to the BS, so that the BS selects an appropriate channel to transmit down-link information.

Currently, the UE reports CSI to the BS periodically or aperiodically. The BS allocates transmission resources for the UE to report the CSI in advance, or allocates transmission resources for the UE while the reporting of the CSI by the UE is triggered. However, since there are a large number of antenna ports and corresponding CSI tasks, transmitting or receiving the CSI occupies plenty of transmission resources. A problem desirable to be solved is how to transmit the CSI using existing transmission resources.

SUMMARY

In view of the above, embodiments of the present disclosure provides a method and a device for transmitting or receiving CSI, where a terminal device determines whether to transmit CSI according to whether the CSI meets a trigger condition for CSI transmission, and determines to request a transmission resource for transmitting the CSI from a network device after determining to transmit the CSI, thereby reducing the transmission resource occupied by the CSI transmission.

In one aspect, embodiments of the present disclosure provide a method for transmitting CSI, including: transmitting, by a terminal device, a resource request message to a network device according to the CSI meeting a CSI trigger condition, where the resource request message is used to request the network device to assign a transmission resource for transmitting the CSI; receiving, by the terminal device, a resource configuration message from the network device, where the resource configuration message is used to configure the transmission resource; transmitting, by the terminal device, the CSI to the network device according to the transmission resource; or, determining, by the terminal device, not to transmit the CSI according to the CSI not meeting the CSI trigger condition.

In the method for transmitting CSI according to the embodiments of the present disclosure, the terminal device determines whether to transmit the CSI according to whether the CSI meets the trigger condition for CSI transmission, and requests the transmission resource for transmitting the CSI from the network device, thereby reducing the transmission resource occupied by the CSI transmission and increasing the flexibility in transmitting the CSI.

In an embodiment, before the transmitting, by a terminal device, a resource request message, the method also includes: receiving, by the terminal device, a CSI trigger condition message from the network device; determining, by the terminal device, the CSI trigger condition according to the CSI trigger condition message.

The terminal device determines the CSI trigger condition by receiving the CSI trigger condition message transmitted by the network device, thereby flexibly applying to different application scenarios.

In an embodiment, where the transmitting, by a terminal device, a resource request message to a network device according to the CSI meeting a CSI trigger condition includes: transmitting, by the terminal device, the resource request message to the network device according to a value of the CSI meeting a threshold.

In the method for transmitting CSI according to embodiments of the present disclosure, the terminal device determines, according to whether the value of the CSI meets the threshold for CSI transmission, to request the transmission resource for transmitting the CSI from the network device, thereby reducing the transmission resource occupied by the CSI transmission and increasing the flexibility in transmitting the CSI.

In an embodiment, where the transmitting, by a terminal device, a resource request message to a network device according to the CSI meeting a CSI trigger condition includes: transmitting, by the terminal device, the resource request message to the network device according to a difference between a first CSI and a second CSI meeting a first threshold, where the first CSI and the second CSI are CSI of different signals; where the transmitting, by the terminal device, the CSI to the network device according to the transmission resource includes: transmitting, by the terminal device, the first CSI and the second CSI to the network device according to the transmission resource.

In an embodiment, the first CSI is CSI of a signal in a neighboring cell of a cell where the terminal device is located, the second CSI is CSI of a signal in the cell where the terminal device is located.

In the method for transmitting CSI according to embodiments of the present disclosure, the terminal device determines, according to the difference between the first CSI and the second CSI meeting the threshold, to request the transmission resource for transmitting the first CSI and the second CSI from the network device, thereby reducing the transmission resource occupied by the CSI transmission and increasing the flexibility in transmitting the CSI.

In an embodiment, where the transmitting, by a terminal device, a resource request message to a network device according to the CSI meeting a CSI trigger condition includes:

transmitting, by the terminal device, the resource request message to the network device according to a difference between a first CSI and a second CSI meeting a first threshold and the first CSI or the second CSI meets a second threshold, where the first CSI and the second CSI are CSI of different signals; where the transmitting, by the terminal device, the CSI to the network device according to the transmission resource includes: transmitting, by the terminal device, the first CSI and the second CSI to the network device according to the transmission resource.

In the method for transmitting CSI according to embodiments of the present disclosure, the terminal device determines, according to the difference between the first CSI and the second CSI meeting first threshold and the first CSI or the second CSI meeting the second threshold, to request the transmission resource for transmitting the first CSI and the second CSI from the network device, thereby reducing the transmission resource occupied by the CSI transmission and increasing the flexibility in transmitting the CSI.

In an embodiment, the resource request message includes: a number of the CSI and a size of each of the CSI, so that the network device configures the transmission resource according to the number of the CSI and the size of each of the CSI.

In another aspect, embodiments of the present disclosure provide a method for receiving CSI, including: receiving, by a network device, a resource request message from a terminal device, where the resource request message is used to request the network device to assign a transmission resource for transmitting the CSI; transmitting, by the network device, a resource configuration message to the terminal device, where the resource configuration message is used to configure the transmission resource; receiving, by the network device, the CSI which is transmitted by the terminal device according to the transmission resource.

In the method for receiving CSI according to embodiments of the present disclosure, the network device assigns the transmission resource for transmitting the CSI to the terminal device according to the resource request message transmitted by the terminal device, since there is no need to reserve the transmission resource, the flexibility in transmitting the CSI is increased.

In an embodiment, before the receiving, by a network device, a resource request message, the method also includes: transmitting, by the network device, a CSI trigger condition message to the terminal device, where the CSI trigger condition message is used by the terminal device to determine a trigger condition for CSI transmission.

In the method for receiving CSI provided by embodiments of the present disclosure, the network device instructs the trigger condition for the terminal device to transmit the current CSI by transmitting the trigger condition message to the terminal device, so that the trigger condition for the terminal device to transmit the CSI may be determined according to different application scenarios.

In an embodiment, the CSI trigger condition message is used to instruct the terminal device to transmit the resource request message to the network device according to a value of the CSI meeting a threshold.

In the method for receiving CSI according to embodiments of the present disclosure, the network device instructs the trigger condition for the terminal device to transmit the CSI through the trigger condition message, so that the trigger condition for the terminal device to transmit the CSI may be determined flexibly according to different application scenarios.

In an embodiment, the CSI trigger condition message is used to instruct the terminal device to transmit the resource request message to the network device according to a difference between a first CSI and a second CSI meeting a first threshold, where the first CSI and the second CSI are CSI of different signals; where the receiving, by the network device, the CSI which is transmitted by the terminal device according to the transmission resource includes: receiving, by the network device, the first CSI and the second CSI which are transmitted by the terminal device according to the transmission resource.

In an embodiment, the first CSI is CSI of a signal in a neighboring cell of a cell where the terminal device is located, and the second CSI is CSI of a signal in the cell where the terminal device is located.

In the method for receiving CSI according to embodiments of the present disclosure, the network device instructs the terminal device to request the transmission resource from the network device according to the difference between the first CSI and the second CSI meeting the threshold, thereby reducing the transmission resource occupied by CSI transmission and increasing the flexibility in transmitting the CSI.

In an embodiment, the CSI trigger condition message is used to instruct the terminal device to transmit the resource request message to the network device according to a difference between a first CSI and a second CSI meeting a first threshold and the first CSI or the second CSI meets a second threshold, where the first CSI and the second CSI are CSI of different signals.

In the method for receiving CSI provided by embodiments of the present disclosure, the network device instructs the terminal device to request the transmission resource from the network device according to the difference between the first CSI and the second CSI meeting the threshold and the first CSI or the second CSI meets the second threshold, thereby reducing the transmission resource occupied by CSI transmission and increasing the flexibility in transmitting the CSI.

In an embodiment, the resource request message includes: a number of the CSI and a size of each of the CSI; the method also includes: configuring, by the network device, the transmission resource according to the number of the CSI and the size of each of the CSI.

In yet another aspect, embodiments of the present disclosure provide a terminal device, the terminal device can implement the functions executed by the terminal device in the methods involved in the above aspects, and the functions may be implemented through hardware, and may also be implemented by executing corresponding software through the hardware. The hardware or software includes one or more units or modules corresponding to the above-mentioned functions.

In a possible design, a structure of the terminal device includes a processor and a transceiver, the processor is configured to support the terminal device to perform the functions corresponding to the above-mentioned methods. The transceiver is configured to support the terminal device to communicate with other network elements. The terminal device may also include a storage, and the storage is configured to be coupled with the processor, and the storage stores program codes and data indispensable for the terminal device.

In yet another aspect, embodiments of the present disclosure provide a network device, the network device can implement the functions executed by the network device in the methods involved in the above aspects, and the functions may be implemented through hardware, and may also be implemented by executing corresponding software through the hardware. The hardware or software includes one or more units or modules corresponding to the above-mentioned functions.

In a possible design, a structure of the network device includes a processor and a transceiver, the processor is configured to support the network device to perform the functions corresponding to the above-mentioned methods. The transceiver is configured to support the network device to communicate with other network elements. The network device may also include a storage, and the storage is configured to be coupled with the processor, and the storage stores program codes and data indispensable for the network device.

In yet another aspect, embodiments of the present disclosure provide a communication system, and the communication system includes the terminal device and the network device according to the above aspects.

In yet another aspect, embodiments of the present disclosure provide a computer storage medium, and the computer storage medium is configured to store computer software instructions used by the terminal device, and the computer software instructions include a program designed for executing the above aspects.

In yet another aspect, embodiments of the present disclosure provide a computer storage medium, and the computer storage medium is configured to store computer software instructions used by the network device, and the computer software instructions include the program designed for executing the above aspects.

BRIEF DESCRIPTION OF DRAWINGS

In order to more clearly illustrate the technical solutions of the embodiments of the present disclosure, the accompany drawings required for the embodiments of the present disclosure will be briefly described. It is apparent that, the drawings described below are merely some of the embodiments of the present disclosure, and other drawings may be obtained by those ordinarily skilled in the art based on these drawings without inventive work.

FIG. 1 is a schematic framework diagram of a communication system for transmitting or receiving CSI, which is applied to an embodiment of the present disclosure;

FIG. 2 is a schematic flowchart of a method for transmitting CSI provided by an embodiment of the present disclosure;

FIG. 3 is a schematic flowchart of a method for receiving CSI provided by an embodiment of the present disclosure;

FIG. 4A is a schematic structural diagram of a possible terminal device provided by an embodiment of the present disclosure;

DESCRIPTION OF EMBODIMENTS

Figure 4B:
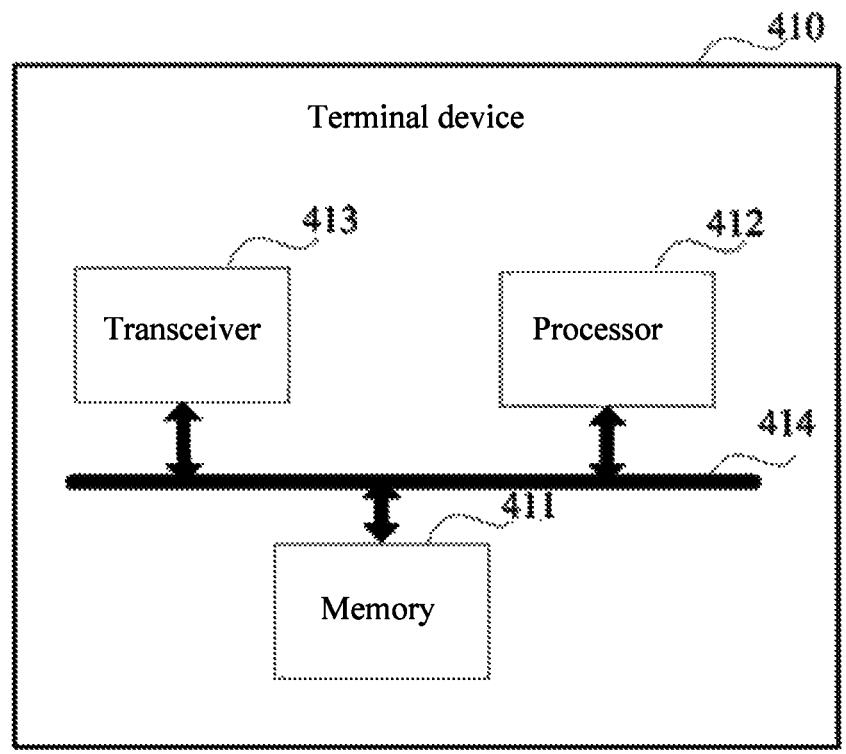
FIG. 4B is a schematic structural diagram of another possible terminal device provided by an embodiment of the present disclosure.

The technical solutions will be described clearly and completely with reference to the accompany drawings of the embodiments of the present disclosure. It is apparent that the described embodiments are merely some instead of all embodiments of the present disclosure. Other embodiments obtained by those ordinarily skilled in the art based on the embodiments of the present disclosure without inventive work fall in the protection scope of the present disclosure.

It should be understood that, the technical solutions of the present disclosure can be applied to various communication systems, for example, a global system of mobile communication (GSM) system, a code division multiple access (CDMA) system, a wideband code division multiple access (WCDMA) system, general packet radio service (GPRS), a LTE frequency division duplex (FDD) system, LTE time division duplex (TDD), a universal mobile telecommunication system (UMTS) and future 5G communication systems.

It should also be understood that, in the embodiments of the present disclosure, a terminal device may communicate with one or more core networks via a radio access network (RAN). The terminal device may be referred to as an access terminal, a user equipment, a subscriber unit, a subscriber station, a mobile station, a remote station, a remote terminal, a mobile device, a user terminal, a terminal, a wireless communication device, a user agent or a user apparatus. An access terminal may be a cell phone, a cordless phone, a session initiation protocol (SIP) phone, a wireless local loop (WLL) station, a personal digital assistant (PDA), a handheld device with wireless communication, a computing device or other processing devices, vehicle embedded devices, wearable devices connected to a wireless modem and a terminal device in a future 5G network.

In the embodiments of the present disclosure, a network device is configured to communicate with a terminal device. The network device may be a base transceiver station (BTS) in GSM or CDMA, or may be a NodeB (NB) in WCDMA, or may be an evolutional Node B (eNB or e-NodeB for short) in LTE, or the network device may be a relay station, an access point, a vehicle embedded device, a wearable device and a network device in a future 5G network, which will not be limited by the present disclosure.

FIG. 1 illustrates a schematic framework diagram of a communication system 100 for transmitting or receiving CSI, which is applied to an embodiment of the present disclosure. As shown in FIG. 1, the communication system 100 may include a network device 102. The network device 102 may include one or more antenna sets, where each antenna set may include one or more antennas. For example, one antenna set may include antennas 104 and 106, and another antenna set may include antennas 108 and 110, and an additional set may include antennas 112 and 114. Although it is shown in FIG. 1 that there are 2 antennas in each antenna set, but it should be understood that there may be more or less antennas in each antenna set. The network device 102 may additionally include a transmitter chain and a receiver chain. Those with ordinary skill in the art should understand that, the transmitter chain and the receiver chain may both include multiple components relating to signal transmission and reception (for example, a processor, a modulator, a multiplexer, a demodulator, a demultiplexer or an antenna, etc.).

The network device 102 may communicate with multiple terminal devices (for example, a terminal device 116 and a terminal device 122). The terminal device 116 communicates with the antenna 112 and the antenna 114, where the antenna 112 and the antenna 114 transmit information to the terminal device 116 via a forward link 118, and receive information from the terminal device 116 via a reverse link 120. In addition, the terminal device 122 communicates with the antenna 104 and the antenna 106, where the antenna 104 and the antenna 106 transmit information to the terminal device 122 via a forward link 124, and receive information from the terminal device 122 via a reverse link 126.

For example, in a frequency division duplex system, the forward link 118 may use a different frequency band than the reverse link 120, and the forward link 124 may use a a different frequency band than the reverse link 126; for another example, in a time division duplex system or a full duplex system, the forward link 118 and the reverse link 120 may use a common frequency band, the forward link 124 and the reverse link 126 may also use a common frequency band.

At a given time, the network device 102, the terminal device 116 or the terminal device 122 may be a wireless communication transmitting apparatus and/or a wireless communication receiving apparatus. When transmitting data, a wireless communication transmitting apparatus may encode data for transmitting. Specifically, the wireless communication transmitting apparatus may obtain (for example, generate, receive from other communication apparatuses or store in a memory) a certain number of to-be-transmitted bits to a wireless communication receiving apparatus via a channel. Such data bits may be included in a transmission block (or multiple transmission blocks) of the data, where the transmission block may be segmented to generate multiple code blocks.

In the following, a method and a device for transmitting and receiving CSI provided by embodiments of the present disclosure will be described in detail with reference to the accompany drawings.

FIG. 2 illustrates a schematic flowchart of a method 200 for transmitting CSI provided by an embodiment of the present disclosure. As shown in FIG. 2, the method 200 includes:

S210: a terminal device transmits a resource request message to a network device according to the channel state information (CSI) meeting a CSI trigger condition, where the resource request message is used to request the network device to assign a transmission resource for transmitting the CSI.

S220: the terminal device receives a resource configuration message from the network device, where the resource configuration message is used to configure the transmission resource.

S230: the terminal device transmits the CSI to the network device according to the transmission resource.

Alternatively, the method 200 includes:

S240: the terminal device determines not to transmit the CSI according to the CSI not meeting the CSI trigger condition.

In S210, the terminal device may determine whether the current CSI needs to be transmitted according to the CSI trigger condition preset in the terminal device, for example, when the CSI is a signal-to-noise ratio (SNR), the CSI trigger condition may be as follows: not transmitting an SNR message when a value of the SNR is greater than or equal to 20 dB, and transmitting the SNR message to the network device when the value of the SNR is smaller than 20 dB, the value of the SNR being greater than or equal to 20 dB means that the terminal device is currently subjected to relatively low interference, the channel quality is relatively good, and there's no need to report the SNR, and the value of the SNR being smaller than 20 dB means that the terminal device is currently subjected to relatively high interference, the channel quality is relatively bad, and the terminal device needs to report the SNR to the network device, so that the network device increases its transmit power or employs other transmission approaches to increase the SNR, in this way, the number or times of CSI transmission may be reduced, thereby saving transmission resources.

When the terminal device determines to transmit the CSI to the network device according to the CSI trigger condition, the terminal device may request the network device to assign the transmission resource for transmitting the CSI. For example, the terminal device may transmit the resource request message to the network device via a physical uplink control channel (PUCCH) to request the network device to assign the transmission resource. The network device may configure a PUCCH resource for the terminal device through a down-link signaling. For example, the network device may configure the PUCCH resource for the terminal device through a radio resource control (RRC) signaling.

In S220, the terminal device may determine the transmission resource through the resource configuration message received from the network device. For example, the terminal device may receive an up-link grant message which is transmitted by the network device and carried in a physical downlink control channel (PDCCH).

In S230, the terminal device determines the transmission resource according to the received resource configuration message, and transmits the CSI through the transmission resource to the network device. For example, the CSI may be transmitted to the network device through a physical uplink shared channel (PUSCH) which is configured based on the resource configuration message.

The above embodiment is merely an example, and embodiments of the present disclosure are not limited thereto. In the method for transmitting CSI according to embodiments of the present disclosure, a terminal device determines whether to transmit the CSI according to whether the CSI meets the trigger condition for CSI transmission, and requests the transmission resource for transmitting the CSI from a network device after determining to transmit the CSI, thereby reducing the transmission resource occupied by the CSI transmission and increasing the flexibility in transmitting the CSI.

In an embodiment, before the terminal device transmits the resource request message, the method further includes:

S201: the terminal device receives a CSI trigger condition message from the network device.

S202: the terminal device determines the CSI trigger condition according to the CSI trigger condition message.

The terminal device may determine the CSI trigger condition according to the CSI trigger condition message transmitted by the network device. For example, the terminal device may receive the CSI trigger condition message, which is transmitted by the network device and carried on the PDCCH, to determine the CSI trigger condition.

The above embodiment is merely an example, and embodiments of the present disclosure are not limited thereto. For example, the terminal device may also receive the CSI trigger condition message which is transmitted by the network device through a high layer signaling.

Therefore, in the method for transmitting CSI according to embodiments of the present disclosure, the terminal device determines the CSI trigger condition through the receiving of the CSI trigger condition message transmitted by the network device. The method may be flexibly applied in multiple application scenarios.

In an embodiment, where the terminal device transmits the resource request message to the network device according to the CSI meeting the CSI trigger condition includes:

S211: the terminal device transmits the resource request message to the network device according to a value of the CSI meeting a threshold.

In an embodiment of the present disclosure, the terminal device may determine to transmit the resource request message to the network device according to the value of the CSI being greater than the threshold, and may also determine to transmit the resource request message to the network according to the value of the CSI being smaller than the threshold, and may also determine to transmit the resource request message to the network according to the value of the CSI being in a certain numerical interval, and may also determine to transmit the resource request message to the network according to the value of the CSI being equal to the threshold.

The above embodiment is merely an example, and embodiments of the present disclosure are not limited thereto. In the method for transmitting CSI according to embodiments of the present disclosure, the terminal device determines, according to whether the value of the CSI meets the threshold for CSI transmission, to request the transmission resource for transmitting the CSI from the network device, thereby reducing the transmission resource occupied by the CSI transmission and increasing the flexibility in transmitting the CSI.

In an embodiment, where the terminal device transmits the resource request message to the network device according to the CSI meeting the CSI trigger condition includes:

S212: the terminal device transmits the resource request message to the network device according to a difference between a first CSI and a second CSI meeting a first threshold, where the first CSI and the second CSI are CSI of different signals;

Where the terminal device transmits the CSI to the network device according to the transmission resource includes:

S231: the terminal device transmits the first CSI and the second CSI to the network device according to the transmission resource.

In an embodiment of the present disclosure, the terminal device may determine to transmit the resource request message to the network device according to the difference between the first CSI and the second CSI meeting the threshold. For example, the second CSI measured by the terminal device at the current moment is greater than the first CSI and the difference is greater than the first threshold. At this time, the terminal device determines to report the first CSI and the second CSI, so that the network device judges an interference situation to which the terminal device is subjected based on the first CSI and the second CSI, and adjusts an approach for transmitting a signal in time. In an embodiment of the present disclosure, the first CSI and the second CSI may be CSI of different types of signals in the same cell, and may also be CSI from different sources, for example, CSI of a signal in a cell where the terminal device is located and CSI of a signal in a neighboring cell of the cell where the terminal device is located.

The above embodiment is merely an example, and embodiments of the present disclosure are not limited thereto. In the method for transmitting CSI according to embodiments of the present disclosure, the terminal device determines, according to the difference between the first CSI and the second CSI meeting the threshold, to request the transmission resource for transmitting the first CSI and the second CSI from the network device, thereby reducing the transmission resource occupied by the CSI transmission and increasing the flexibility in transmitting the CSI.

In an embodiment, where the terminal device transmits the resource request message to the network device according to the CSI meeting the CSI trigger condition includes:

S213: the terminal device transmits the resource request message to the network device according to a difference between a first CSI and a second CSI meeting a first threshold and the first CSI or the second CSI meets a second threshold, where the first CSI and the second CSI are CSI of different signals;

where the terminal device transmits the CSI to the network device according to the transmission resource includes:

S232: the terminal device transmits the first CSI and the second CSI to the network device according to the transmission resource.

The terminal device may also determine, according to the difference between the second CSI and the first CSI being smaller than the first threshold, and the second CSI being smaller than the second threshold, to transmit the resource request message to the network device to request the network device to assign the transmission resource for transmitting the first CSI and the second CSI for the terminal device. The first CSI is CSI of a signal in a neighboring cell of the cell where the terminal device is located, the second CSI is CSI of a signal in a cell where the terminal device is located. The first threshold and the second threshold may be the same or different. The network device may determine, according to the difference between the second CSI and the first CSI being smaller than the first threshold, that the strength of the interference signal in the neighboring cell is very close to the strength of the signal in the cell where the terminal device is located, and determine, according to the second CSI being smaller than the second threshold, that the channel state of the cell where the terminal device is located is relatively bad, thereby adjusting an approach for transmitting a signal based on the interference situation. In an embodiment of the present disclosure, the first CSI and the second CSI may also be CSI of different types of signals in the same cell.

The above embodiment is merely an example, and embodiments of the present disclosure are not limited thereto. In the method for transmitting CSI according to embodiments of the present disclosure, the terminal device determines, according to the difference between the first CSI and the second CSI meeting first threshold and the first CSI or the second CSI meeting the second threshold, to request the transmission resource for transmitting the first CSI and the second CSI from the network device, thereby reducing the transmission resource occupied by the CSI transmission and increasing the flexibility in transmitting the CSI.

In an embodiment, the resource request message includes: a number of the CSI and a size of each of the CSI, so that the network device configures the transmission resource according to the number of the CSI and the size of each of the CSI.

The terminal device may transmit information about the number of the CSI and the size of each of the CSI to the network device. The information may be carried in the resource request message or transmitted separately. The network device may configure a corresponding transmission resource for the terminal device according to the number of the to-be-transmitted CSI and the size of each of the CSI. Therefore, the terminal device may transmit the CSI through the appropriate transmission resource, thus avoiding the waste of transmission resource.

The method for transmitting CSI according to embodiments of the present disclosure is described above in detail from the perspective of the terminal device. In the following, the method for receiving CSI according to embodiments of the present disclosure will be described from the perspective of the network device.

FIG. 3 illustrates a schematic flowchart of a method for receiving CSI provided by an embodiment of the present disclosure. As shown in FIG. 3, the method 300 includes:

S310: a network device receives a resource request message from a terminal device, where the resource request message is used to request the network device to assign a transmission resource for transmitting the channel state information (CSI).

S320: the network device transmits a resource configuration message to the terminal device, where the resource configuration message is used to configure the transmission resource.

S330: the network device receives the CSI which is transmitted by the terminal device according to the transmission resource.

After determining to transmit the CSI, the terminal device transmits the resource request message to the network device to request the network device to assign the transmission resource for transmitting the CSI for the terminal device. The network device may configure a PUCCH resource for the terminal device through a RRC signaling, the PUCCH resource is used to transmit the resource request message.

After receiving the resource request message, the network device assigns the transmission resource for transmitting the CSI for the terminal device. For example, the network device may transmit an up-link grant message to the terminal device (i.e., the resource configuration message) via a PDCCH, where the up-link grant message is used to indicate the PUSCH resource for transmitting the CSI.

Then, the network device receives, according to the PUSCH resource, the CSI transmitted by the terminal device, and determines a subsequent approach for transmitting a signal based on the channel state reflected by the CSI.

The above embodiment is merely an example, and embodiments of the present disclosure are not limited thereto. In the method for receiving CSI according to embodiments of the present disclosure, the network device assigns the transmission resource for transmitting the CSI for the terminal device according to the resource request message transmitted by the terminal device, and since there is no need to reserve the transmission resource, the flexibility in transmitting the CSI is increased.

In an embodiment, before the network device receives the resource request message, the method further includes:

S301: the network device transmits a CSI trigger condition message to the terminal device, where the CSI trigger condition message is used by the terminal device to determine the trigger condition for CSI transmission.

The network device may determine the trigger condition for the terminal device to transmit the CSI based on actual situations. For example, when the terminal device enters a cell in which the signal is relatively bad from a cell in which the signal is relatively good, the network device may transmit the CSI trigger condition message to the terminal device so as to increase the frequency for the terminal device to transmit the CSI, so that the network device may determine a channel state and adjust an approach for transmitting a signal according to the CSI transmitted by the terminal device.

The above embodiment is merely an example, and embodiments of the present disclosure are not limited thereto. In the method for receiving CSI according to embodiments of the present disclosure, the network device instructs the trigger condition for the terminal device to transmit the current CSI by transmitting the CSI trigger condition message to the terminal device, so that the trigger condition for the terminal device to transmit the CSI may be determined flexibly according to different application scenarios.

In an embodiment, the CSI trigger condition message is used to instruct the terminal device to transmit the resource request message to the network device according to a value of the CSI meeting a threshold.

For example, the terminal device may determine, according to the value of the CSI being greater than the threshold, to transmit the resource request message to the network device, and may also determine, according to the value of the CSI being smaller than the threshold, to transmit the resource request message to the network device, and may also determine, according to the value of the CSI being in a certain numerical interval, to transmit the resource request message to the network device, and may also determine, according to the value of the CSI being equal to the threshold, to transmit the resource request message to the network device.

The above embodiment is merely an example, and embodiments of the present disclosure are not limited thereto. In the method for receiving CSI according to embodiments of the present disclosure, the network device instructs the trigger condition for the terminal device to transmit the CSI through the trigger condition message, so that the trigger condition for the terminal device to transmit CSI may be determined flexibly according to different application scenarios.

In an embodiment, the CSI trigger condition message is used to instruct the terminal device to transmit the resource request message to the network device according to a difference between a first CSI and a second CSI meeting a first threshold, where the first CSI and the second CSI are CSI of different signals.

Where the network device receives the CSI which is transmitted by the terminal device according to the transmission resource includes:

the network device receives the first CSI and the second CSI which are transmitted by the terminal device according to the transmission resource.

The terminal device may determine, according to the difference between different CSI meeting the threshold, to transmit the resource request message to the network device. For example, the second CSI measured by the terminal device at the current moment is greater than the first CSI and the difference is greater than the first threshold. At this time, the terminal device determines to report the first CSI and the second CSI, so that the network device judges an interference situation to which the terminal device is subjected based on the first CSI and the second CSI, and adjusts an approach for transmitting a signal in time. In an embodiment of the present disclosure, the first CSI and the second CSI may be CSI of different types of signals in the same cell, and may also be CSI from different sources, for example, CSI of a signal in a cell where the terminal device is located and CSI of a signal in a neighboring cell of the cell where the terminal device is located.

The above embodiment is merely an example, and embodiments of the present disclosure are not limited thereto. In the method for receiving CSI according to embodiments of the present disclosure, the network device instructs the terminal device to request the transmission resource from the network device according to the difference between the first CSI and the second CSI meeting the threshold, thereby reducing the transmission resource occupied by the CSI transmission and increasing the flexibility in transmitting the CSI.

In an embodiment, the CSI trigger condition message is used to instruct the terminal device to transmit the resource request message to the network device according to a difference between a first CSI and a second CSI meeting a first threshold and the first CSI or the second CSI meets a second threshold, where the first CSI and the second CSI are CSI of different signals.

The terminal device may also determine, according to the difference between the second CSI and the first CSI being smaller than the first threshold, and the second CSI being smaller than the second threshold, to transmit the resource request message to the network device to request the network device to assign the transmission resource for transmitting the first CSI and the second CSI for the terminal device. The first CSI is CSI of a signal in a neighboring cell of the cell where the terminal device is located, the second CSI is CSI of a signal in the cell where the terminal device is located. The first threshold and the second threshold may be the same or different. The network device may determine, according to the difference between the second CSI and the first CSI being smaller than the first threshold, that the strength of the interference signal in the neighboring cell is very close to the strength of the signal in the cell where the terminal device is located, and determine, according to the second CSI being smaller than the second threshold, that the channel state of the cell where the terminal device is located is relatively bad, thereby adjusting an approach for transmitting a signal based on the interference situation. In an embodiment of the present disclosure, the first CSI and the second CSI may also be CSI of different types of signals in the same cell.

The above embodiment is merely an example, and embodiments of the present disclosure are not limited thereto. In the method for receiving CSI provided by embodiments of the present disclosure, the network device instructs the terminal device to request the transmission resource from the network device according to the difference between the first CSI and the second CSI meets the threshold and the first CSI or the second CSI meets the second threshold, thereby reducing the transmission resource occupied by the CSI transmission and increasing the flexibility in transmitting the CSI.

In an embodiment, the resource request message includes: a number of the CSI and a size of each of the CSI; the method 300 also includes: the network device configures the transmission resource according to the number of the CSI and the size of each of the CSI.

The terminal device may transmit information about the number of the CSI and the size of each of the CSI to the network device. The information may be carried in the resource request message or transmitted separately. The network device may configure a corresponding transmission resource for the terminal device according to the number of the to-be-transmitted CSI and the size of each of the CSI. Therefore, the terminal device may transmit the CSI through the appropriate transmission resource, thus avoiding the waste of transmission resource.

The foregoing embodiments mainly introduce solutions of embodiments of the present disclosure from the perspective of interaction between the terminal device and the network device. It can be understood that, in order to implement the above functions, each device includes a corresponding hardware structure and/or a software module for performing each function. Those skilled in the art will readily appreciate that the present disclosure can be implemented in hardware or a combination of hardware and computer software combined with elements and algorithm steps of the various examples described in the embodiments disclosed herein. Whether a function is implemented in hardware or by computer software driving hardware depends on the specific application and design constraints of the technical solution. The skilled person can use a different method for each specific application to implement the described function, but such implementation should not be considered to be beyond the scope of the present disclosure.

Embodiments of the present disclosure may divide the terminal device and the network device based on functional units according to the foregoing method example. For example, the function units may be divided according to their respective functions, and two or more functions may also be integrated in one processing unit. The above integrated unit may be implemented in hardware, and may also be implemented in a software function unit. It should be noted that the division of the units in embodiments of the present disclosure is schematic, and is merely a division of logical functions, and other division manners may also apply in actual implementations.

In the case where integrated units are adopted, FIG. 4A illustrates a schematic structural diagram of a possible structure of a terminal device involved in the above embodiments of the present disclosure. The terminal device 400 includes: a processing unit 402 and a communicating unit 403. The processing unit 402 is configured to perform control and management on an action of the terminal device 400. For example, the processing unit 402 is configured to support the terminal device 400 to perform the steps in FIG. 2 and/or other processes of the technique described herein. The communicating unit 403 is configured to support the communication between the terminal device 400 and a network device. The terminal device 400 may also include a storage unit 401 which is configured to store program codes and data of the terminal device 400.

For example, the processing unit 402 is configured to transmit a resource request message to a network device via the communicating unit 403 according to channel state information (CSI) meeting a CSI trigger condition, where the resource request message is used to request the network device to assign a transmission resource for transmitting the CSI; and configured to receive a resource configuration message from the network device via the communicating unit 403, where the resource configuration message is used to configure the transmission resource; and configured to transmit the CSI to the network device via the communicating unit 403 according to the transmission resource.

The processing unit 402 may be a processor or a controller, for example, it may be a central processing unit (CPU), a general-purpose processor, a digital signal processor (DSP), an application-specific integrated circuit (ASIC), a field programmable gate array (FPGA) or other programmable logic devices, transistor logic devices, hardware components, or any combination thereof. The processing unit 402 may implement or execute various exemplary logical blocks, modules and circuits described in connection with the disclosure of the present disclosure. The processor may a combination of processors that implement computing functions. For example, the processor may contain a combination of one or more microprocessors, a combination of a DSP and a microprocessor or the like. The communicating unit 403 may be a transceiver, a transceiver circuit or the like. The storage unit 401 may be a memory.

When the processing unit 402 is a processor, the communicating unit 403 is a transceiver, and the storage unit 401 is a memory, the terminal device involved in the embodiments of the present disclosure may be a terminal device shown in FIG. 4B.

Referring to FIG. 4B, a terminal device 410 includes: a processor 412, a transceiver 413 and a memory 411. In an embodiment, the terminal device 410 may also include a bus

414. The processor 412, the transceiver 413 and the memory 411 may be connected with each other via a bus 414; the bus 414 may be a peripheral component interconnect (PCI) bus or an extended industry standard architecture (EISA) bus, etc. The bus 414 can be divided into an address bus, a data bus, a control bus, etc. For the ease of illustration, the bus is shown as one thick line in FIG. 4B, but it does not mean there is only one bus or one type of bus.

Those skilled in the art can clearly understand that regarding the specific working processes of the devices and units described above, reference may be made to the corresponding processes in the foregoing method embodiments, which will not be repeated herein for the convenience and brevity of the description.

Therefore, the terminal device provided by embodiments of the present disclosure determines whether to transmit CSI according to whether the CSI meets the trigger condition for CSI transmission, and requests the transmission resource for transmitting the CSI from the network device after determining to transmit the CSI, thereby reducing the transmission resource occupied by the CSI transmission.

Figure 5A:
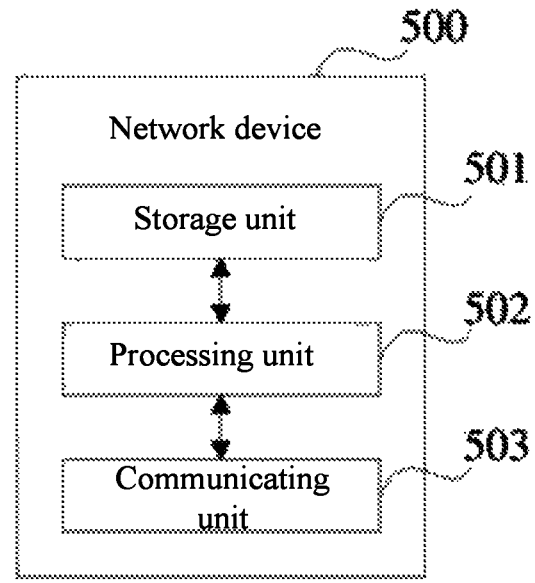
FIG. 5A is a schematic structural diagram of a possible network device provided by an embodiment of the present disclosure.

In the case where integrated units are adopted, FIG. 5A illustrates a schematic structural diagram of a possible structure of a network device involved in the above embodiments of the present disclosure. The network device 500 includes: a processing unit 502 and a communicating unit 503. The processing unit 502 is configured to perform control and management on an action of the network device 500. For example, the processing unit 502 is configured to support the network device 500 to perform the steps in FIG. 3 and/or other processes of the technique described herein. The communicating unit 503 is configured to support the communication between the network device 500 and the terminal device. The network device 500 may also include a storage unit 501 which is configured to store program codes and data of the network device 500.

For example, the processing unit 502 is configured to receive the resource request message from the terminal device via the communicating unit 503, where the resource request message is used to request the network device to assign a transmission resource for transmitting the channel state information (CSI); and configured to transmit the resource configuration message to the terminal device via the communicating unit 503, where the resource configuration message is used to configure the transmission resource; and configured to receive the CSI which is transmitted by the terminal device according to the transmission resource via the communicating unit 503.

The processing unit 502 is a processor or a controller, for example, it may be a CPU, a general-purpose processor, a DSP, an ASIC, an FPGA or other programmable logic devices, transistor logic devices, hardware components, or any combination thereof. The processing unit 502 may implement or execute various exemplary logical blocks, modules and circuits described in connection with the disclosure of the present disclosure. The processor may a combination of processors that implement computing functions. For example, the processor may include a combination of one or more microprocessors, a combination of a DSP and a microprocessor or the like. The communicating unit 503 may be a transceiver, a transceiver circuit or the like. The storage unit 501 may be a memory.

Figure 5B:
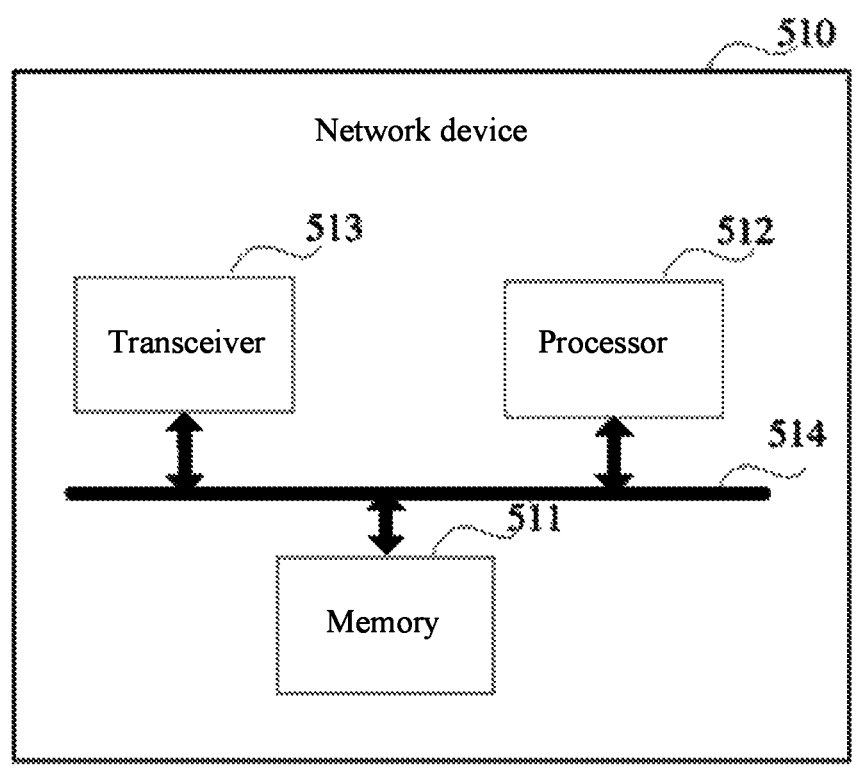
FIG. 5B is a schematic structural diagram of another possible network device provided by an embodiment of the present disclosure.

When the processing unit 502 is a processor, the communicating unit 503 is a transceiver, and the storage unit 501 is a memory, the network device involved in the embodiments of the present disclosure may be a network device shown in FIG. 5B.

Referring to FIG. 5B, a network device 510 includes: a processor 512, a transceiver 513 and a memory 511. In an embodiment, the network device 510 may also include a bus 514. The processor 512, the transceiver 513 and the memory 511 may be connected with each other via a bus 514; the bus 514 may be a PCI bus or an EISA bus, etc. The bus 514 can be divided into an address bus, a data bus, a control bus, etc. For the ease of illustration, the bus is shown as one thick line in FIG. 5B, but it does not mean there is only one bus or one type of bus.

Those skilled in the art can clearly understand that regarding the specific working processes of the devices and units described above, reference may be made to the corresponding processes in the foregoing method embodiments, which will not be repeated here for the convenience and brevity of the description.

Therefore, the network device provided by embodiments of the present disclosure configures the transmission resource for transmitting the CSI for the terminal device according to the resource request message of the terminal device, where the terminal device requests the transmission resource for transmitting the CSI from the network device according to the CSI meeting the trigger condition for CSI transmission, thereby reducing the transmission resource occupied by the CSI transmission.

At least two kinds of subcarrier intervals are determined according to preset information or indication information transmitted by the network device, and two different PDCCI Is based on the two subcarrier intervals are received, thereby solving the problem of how to access and reside in a communication system having multiple subcarrier intervals.

In embodiments of the present disclosure, the serial numbers of the processes do not indicate execution orders, and as the execution order of each process should be decided according to its function and internal logics, the implementation processes should not be limited by the above serial numbers.

Additionally, the term "and/or" herein only describes a relationship of association between associated objects, meaning there may be three kinds of relationships, for example, A and/or B may mean that only A exists, A and B exist at the same time, or only B exists. Besides, the character "/" generally indicates the relationship between the former associated object and the latter associated object is "or".

The steps of the method or algorithm described in connection with the disclosure of the embodiments of the present disclosure may be implemented in hardware, or may be implemented by a processor executing software instructions. The software instructions may be composed of corresponding software modules, and the software modules may be stored in a random access memory (RAM), a flash memory, a read only memory (ROM), an erasable programmable ROM (EPROM), an electrically EPROM (EEPROM), a register, a hard disk, a removable hard disk, a compact disk read only memory (CD-ROM) or any other form of storage medium known in the art. An exemplary storage medium is coupled to the processor, such that the processor can read information from, and write information to, the storage medium. Of course, the storage medium can also be a part of the processor. The processor and the storage medium may be located in the ASIC. In addition, the ASIC may be located in the terminal device or network device. Of course, the processor and the storage medium may also exist as discrete components in the terminal device or network device.

Those skilled in the art should appreciate that the functions described herein may be implemented in hardware, software, firmware, or any combination thereof in one or more of the above examples. When implemented in software, these functions may be stored in a computer readable medium or transmitted as one or more instructions or codes in a computer readable medium. The computer readable medium includes a computer storage medium and a communication medium. Where the communication medium includes any medium that facilitates the transfer of a computer program from one place to another. The storage medium may be any available medium that can be accessed by a general purpose or special purpose computer.

The objects, the technical solutions and the advantageous effects of the present disclosure are further described in detail through the above-described embodiments. It should be understood that the above description is only embodiments of the present disclosure and is not intended to limit the protection scope of the present disclosure, and any modifications, equivalent substitutions, improvements, etc., which are made based on the technical solutions of the present disclosure, should be included in the protection scope of the present disclosure.

What is claimed is:

1. A method for transmitting channel state information (CSI), wherein the method comprises:
    transmitting, by a terminal device, a resource request message to a network device according to the CSI meeting a CSI trigger condition, wherein the resource request message is used to request the network device to assign a transmission resource for transmitting the CSI;
    receiving, by the terminal device, a resource configuration message from the network device, wherein the resource configuration message is used to configure the transmission resource;
    transmitting, by the terminal device, the CSI to the network device according to the transmission resource;
    wherein the transmitting, by a terminal device, a resource request message to a network device according to the CSI meeting a CSI trigger condition comprises:
    transmitting, by the terminal device, the resource request message to the network device according to a difference between a first CSI and a second CSI meeting a first threshold and at least one of the first CSI and the second CSI meeting a second threshold, wherein the first CSI and the second CSI are information of different signals, and the first CSI is information of a signal in a first cell being a neighboring cell of a second cell being a cell where the terminal device is located, the second CSI is information of a signal in the second cell, the first threshold indicates that a strength of an interference signal in the first cell is close to a strength of an interference signal in the second cell, in terms of signal to noise ratio for the first cell and the second cell being above a predetermined level, and the second threshold indicates a channel state of at least one of the first cell and the second cell is worse than the other one of the first cell and the second cell;
    wherein the transmitting, by the terminal device, the CSI to the network device according to the transmission resource comprises:
    transmitting, by the terminal device, the first CSI and the second CSI to the network device according to the transmission resource more frequently than transmitting the first CSI and the second CSI in one of the first cell and the second cell having a channel state better than the other one of the first cell and the second cell.

2. The method according to claim 1, wherein before the transmitting, by a terminal device, a resource request message, the method further comprises:
    receiving, by the terminal device, a CSI trigger condition message from the network device;
    determining, by the terminal device, the CSI trigger condition according to the CSI trigger condition message.

3. The method according to claim 1, wherein the resource request message comprises a number of the CSI and a size of each of the CSI, so that the network device configures the transmission resource according to the number of the CSI and the size of each of the CSI.

4. A method for receiving channel state information (CSI), wherein the method comprises:
    receiving, by a network device, a resource request message from a terminal device, wherein the resource request message is used to request the network device to assign a transmission resource for transmitting the CSI;
    transmitting, by the network device, a resource configuration message to the terminal device, wherein the resource configuration message is used to configure the transmission resource; receiving, by the network device, the CSI which is transmitted by the terminal device according to the transmission resource;
    wherein the resource request message is transmitted from the terminal device to the network device according to a difference between a first CSI and a second CSI meeting a first threshold and at least one of the first CSI and the second CSI meeting a second threshold, wherein the first CSI and the second CSI are information of different signals, and the first CSI is information of a signal in a first cell being a neighboring cell of a second cell being a cell where the terminal device is located, the second CSI is information of a signal in the second cell, the first threshold indicates that a strength of an interference signal in the first cell is close to a strength of an interference signal in the second cell, in terms of signal to noise ratio for the first cell and the second cell being above a predetermined level, and the second threshold indicates a channel state of at least one of the first cell and the second cell is worse than the other one of the first cell and the second cell;
    wherein the receiving, by the network device, the CSI which is transmitted by the terminal device according to the transmission resource comprises:
    receiving, by the network device, the first CSI and the second CSI which are transmitted by the terminal device according to the transmission resource more frequently than receiving the first CSI and the second CSI in one of the first cell and the second cell having a channel state better than the other one of the first cell and the second cell.

5. The method according to claim 4, wherein before the receiving, by a network device, a resource request message, the method further comprises:
    transmitting, by the network device, a CSI trigger condition message to the terminal device, wherein the CSI trigger condition message is used by the terminal device to determine a trigger condition for CSI transmission.

6. The method according to claim 4, wherein the resource request message comprises a number of the CSI and a size of each of the CSI;

the method further comprises: configuring, by the network device, the transmission resource according to the number of the CSI and the size of each of the CSI.

7. A terminal device, comprising a processor and a memory having executable instructions stored thereon that when executed by the processor cause the processor to execute the following steps:

transmitting a resource request message to a network device according to channel state information (CSI) meeting a CSI trigger condition, wherein the resource request message is used to request the network device to assign a transmission resource for transmitting the CSI;

receiving a resource configuration message from the network device, wherein the resource configuration message is used to configure the transmission resource; and transmitting the CSI to the network device according to the transmission resource; wherein the transmitting a resource request message to a network device according to channel state information (CSI) meeting a CSI trigger condition comprises: transmitting the resource request message to the network device according to a difference between a first CSI and a second CSI meeting a first threshold and at least one of the first CSI and the second CSI meeting a second threshold, wherein the first CSI and the second CSI are information of different signals, and the first CSI is information of a signal in a first cell being a neighboring cell of a second cell being a cell where the terminal device is located, the second CSI is information of a signal in the second cell, the first threshold indicates that a strength of an interference signal in the first cell is close to a strength of an interference signal in the second cell, in terms of signal to noise ratio for the first cell and the second cell being above a predetermined level, and the second threshold indicates a channel state of at least one of the first cell and the second cell is worse than the other one of the first cell and the second cell, and the transmitting the CSI to the network device according to the transmission resource comprises: transmitting the first CSI and the second CSI to the network device according to the transmission resource more frequently than transmitting the first CSI and the second CSI in one of the first cell and the second cell having a channel state better than the other one of the first cell and the second cell.

8. The terminal device according to claim 7, wherein the processor is further configured to:

receive a CSI trigger condition message from the network device;

determine the CSI trigger condition according to the CSI trigger condition message.

9. The terminal device according to claim 7, wherein the resource request message comprises a number of the CSI and a size of each of the CSI, so that the network device configures the transmission resource according to the number of the CSI and the size of each of the CSI.

* * * * *